March 16, 1954   J. D. GAY, JR   2,672,004
COMB WIPER FOR SEED STRIPPERS
Filed July 20, 1949   2 Sheets-Sheet 1
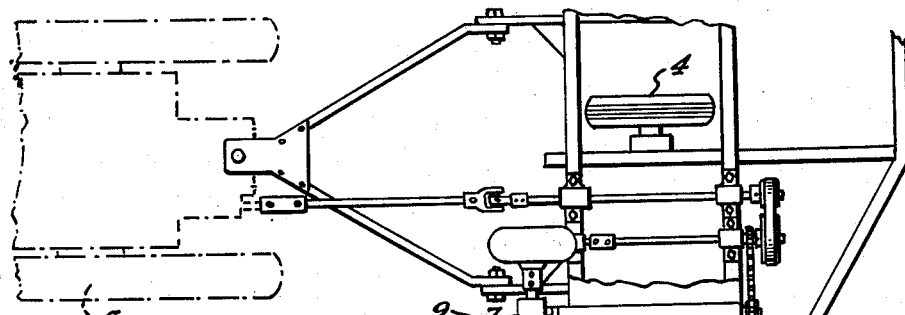
FIG.1.
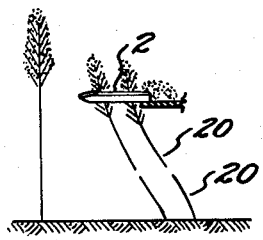
FIG.4.
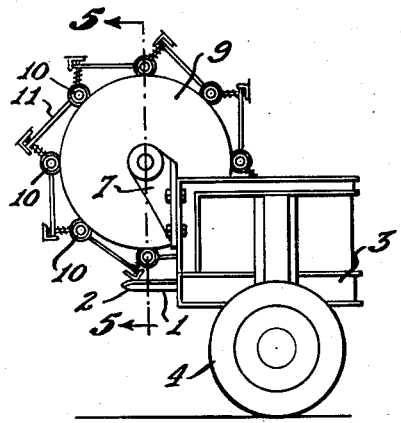
FIG.2.
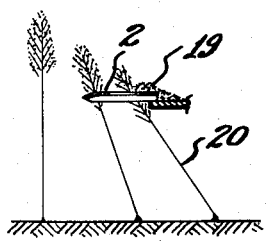
FIG.3.
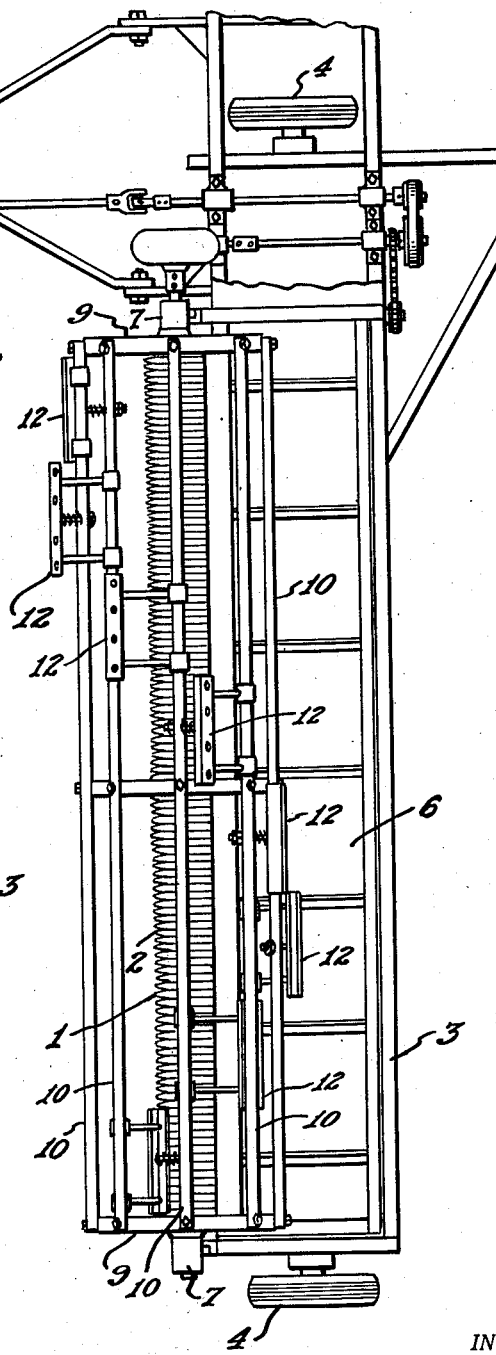
INVENTOR.
JACOB DOUGLAS GAY, JR.,
BY Allen + Allen
ATTORNEYS.

March 16, 1954 — J. D. GAY, JR — 2,672,004
COMB WIPER FOR SEED STRIPPERS
Filed July 20, 1949 — 2 Sheets-Sheet 2
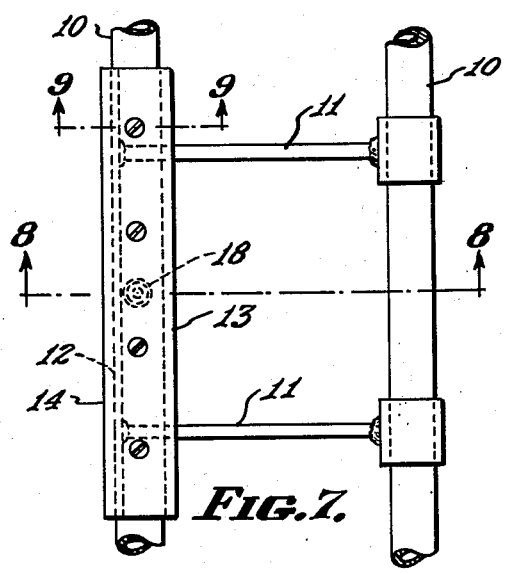
FIG.5.
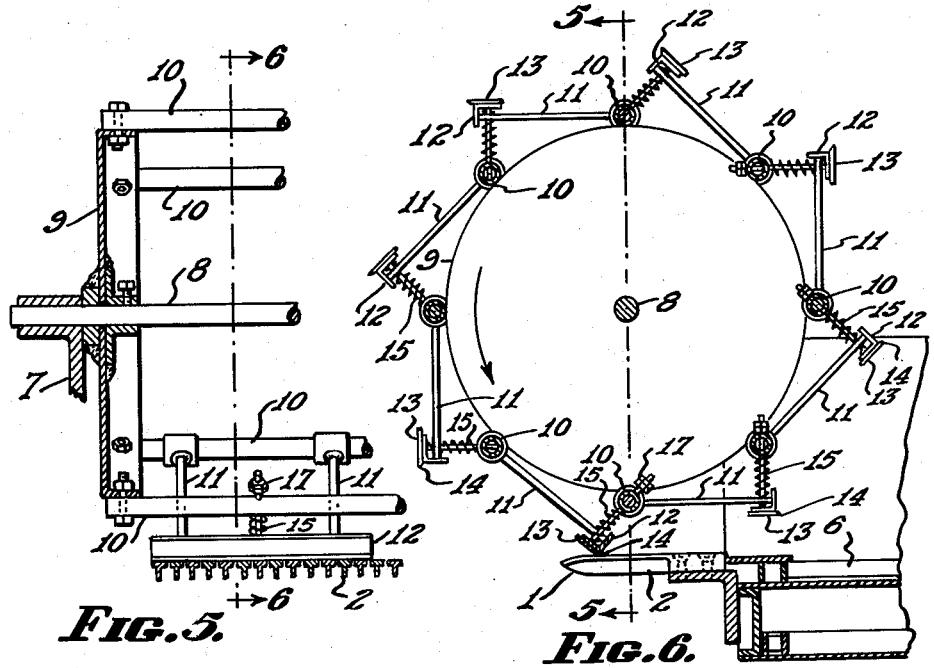
FIG.6.
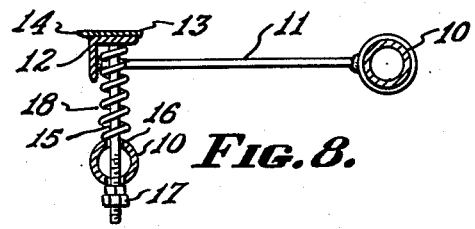
FIG.7.
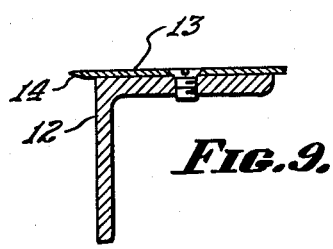
FIG.9.
FIG.8.
INVENTOR.
JACOB DOUGLAS GAY, JR,
BY Allen + Allen
ATTORNEYS.

Patented Mar. 16, 1954

2,672,004

UNITED STATES PATENT OFFICE 2,672,004

COMB WIPER FOR SEED STRIPPERS

Jacob Douglas Gay, Jr., Pine Grove, Ky., assignor to Gay-Bell Corporation, Paris, Ky., a corporation of Kentucky Application July 20, 1949, Serial No. 105,689

8 Claims. (Cl. 56—128)

My invention relates to a comb wiper for use on a seed stripper for wiping the stripped seed off the comb during the stripping operation. The conventional type of seed stripper includes a horizontal stripping comb which is moved through the field of grass or grain so that the individual stalks carrying the seed slip between the teeth of the comb which are spaced apart the approximate diameter of the stalks. In this way, the seed is stripped from the stalk as the comb moves onwardly.

While the comb normally strips the seed from the stalk, at times the stalk is broken and becomes wedged between adjacent teeth.

In the usual practice, it is necessary to manually continue to sweep the seed from the surface of the comb back into a trough or conveyor which is usually positioned behind the comb. It is also necessary to break off or remove stalks jammed between adjacent teeth.

It is an object of my invention to provide a comb wiper which continually wipes the stripped seed from the surface of the comb and which also shears any of the stalk or hay which has become jammed between adjacent teeth.

It is a further object of my invention to provide a comb wiper which does not injure the seed in any way and which does not tend to force the stalk between the teeth of the comb in such a way as to jam the same between the teeth.

It is a further object of my invention to provide a comb wiper which will shear off or cut any stalks or hay jammed between the teeth.

It is a further object of my invention to provide a comb wiper which is very rugged in construction and very simple so that maintenance and repair are at a minimum.

These and other objects of my invention which will be set forth hereinafter or will be apparent to one skilled in the art upon reading these specifications, I accomplish by that certain construction and arrangement of parts of which I shall now describe an exemplary embodiment. Reference is now made to the drawings which from a part hereof and in which:

Figure 1 is a plan view with parts broken away of a seed stripper and my novel comb wiper.

Figure 2 is an end elevation of the stripper and wiper shown in Figure 1.

Figure 3 is a fragmentary side elevation showing the comb of the seed stripper when stripping the seed in the preferred manner.

Figure 4 is similar to Figure 3, but shows the stripper comb breaking the stalks of the grass.

Figure 5 is an enlarged partial section taken on the section line 5—5 of Figure 2 and Figure 6.

Figure 6 is a transverse section of the wiper taken on the section line 6—6 of Figure 5.

Figure 7 is an enlarged plan view of a portion of my wiper showing the wiper blade mounting.

Figure 8 is a section taken on the section line 8—8 of Figure 7.

Figure 9 is an enlarged section taken on the section line 9—9 of Figure 7.

Briefly, in the practice of my invention, I provide a comb wiper consisting of a cylindrical framework rotating on an axis parallel to and spaced above the surface of the stripper comb. The stripper comb is drawn through the field at a rate between three and five miles an hour and provision is made for rotating the cylindrical framework. On the framework, I provide wiping blades which are resiliently forced outwardly from the framework and so positioned that they will wipe across the upper surface of the comb brushing the stripped seed into a conveyor to the rear of the comb. The wiper blades are provided with a cutting edge so that in the event any stalks or straw is jammed between adjacent teeth of the comb, they will be sheared off against the base of the comb and swept along with the seed into the conveyor.

I preferably mount a plurality of relatively short blades on the cylindrical framework in a helical formation around the surface. This tends to balance the structure and also to make the sweeping of the comb progressive. The framework revolves at a relatively slow speed, approximately fifty revolutions per minute. By this adjustment of speeds, a number of stalks are stripped and the seed permitted to stack up on the comb before the wiping blade wipes them into the conveyor behind the comb.

While I have shown a plurality of wiping blades arranged in the helical manner around my cylindrical frame, it is within the contemplation of my invention to provide a single long blade where this would be appropriate, or to arrange a plurality of blades either in a straight line the full length of the frame or in other configurations than a helix.

I have shown the stripper being drawn by a tractor which also provides the power for rotating the frame. However, it is understood that a stripper may be self-motivated, pushed, or pulled by any kind of mechanism, or by means of horses, and the power which rotates the frame may be from any source.

Referring to the drawings, the stripping comb 1 is made up of a plurality of individual teeth 2, spaced apart a distance slightly larger than the diameter of the grass stalks being stripped.

The comb 1 is mounted on a framework 3, which in turn rides on wheels 4 and is drawn over the surface of the field by a tractor or the like 5.

In the drawings, I have shown a continuous conveyor belt 6, which moves the seed after it has been swept from the comb 1 to one end of the frame 3, where it is dumped into a hopper or container, not shown. It is to be understood that the conveyor 6 is not a part of this invention, since any kind of a conveyor may be used, or the seed may remain in a trough or on a platform to the rear of the comb.

Journaled to brackets 7 is a shaft 8 having a framework or hub 9 at each end thereof. There are a plurality of longitudinal parallel rods 10 running between the hubs 9 so as to form a cylindrical framework, as shown in Figures 2 and 6. The framework composed of the rods 10 is mounted above and parallel to the upper surface of the comb 1.

Pintled to the rods 10 are arms 11 which are rotatable around the rods 10 as a pintle (see Figures 5 and 7). On the ends of the arms 11 are fastened my wiping blades 12 which preferably consist of a strip of angle metal as shown in Figure 9. On one of the webs of the wiping blades 12, I provide a cutting blade 13 with the cutting edge 14 projecting from the juncture of the two webs (see Figure 9).

In order to force the wiping blades 12 outwardly, I provide a rod 15, a portion of which projects through an aperture 16 of the rod adjacent to the one to which the arms 11 are pintled. The end of the rod 15 is attached to the wiping blade 12 (see Figure 8). The aperture 16 is very much larger than the diameter of the rod 15 and a nut 17 is threaded onto the end of the rod 15 so as to limit its movement through the aperture. A coiled helical spring 18 is positioned between the rod 10 and the wiping blade 12. In my preferred embodiment, I have found it convenient to place the helical spring 18 around the rod 15. From this construction, it is apparent that the projection of the wiping blade from the surface of the frame may be adjusted by adjusting the nut 17 on the rod 15.

The positioning of the frame of rods 10 and the adjustment of the nut 17 is such that as the frame of rods 10 rotates, the wiping blades 12 will sweep across the upper face of the comb 1, as shown in Figure 6. This action, as is apparent, sweeps accumulated seed across the upper surface of the comb 1 and onto the conveyor 6.

In Figure 3 I have shown the teeth 2 of the comb stripping the seed 19 from the stalk 20. However, at times the stalk 20 is broken by the action of the comb and the stalk 20 itself remains between adjacent teeth 2, as shown in Figure 4. When this happens, the cutting edge 14 of the blade 13 forces the piece of stalk 20 to the base of the comb 1 and shears it off so that the upper surface of the comb remains clean. This action also permits the lower portion of the stalk 20 to fall to the ground from the comb 1.

From the above, it is apparent that I have provided a comb wiper which sweeps and wipes the upper surface of the comb without forcing the stalks 20 into the teeth of the comb so as to break them. It is also apparent that my comb wiper shears off any random stalks which catch between adjacent teeth and would tend to clog the comb.

As is apparent from the above, my comb wiper is quite simple and rugged in construction and may be easily serviced and repaired when necessary. The drive is quite simple since the load on the revolving wiper is relatively small. This is particularly true when the individual blades are arranged helically around the surface of the framework.

It is to be understood that different forms of my preferred form may be made without departing from the spirit of my invention.

Having thus described my invention, what I claim as new and desire to secure by Letters Patent is:

1. In combination with a seed stripper including a horizontal stripping comb, a comb wiper comprising a cylindrical frame rotating on an axis parallel to the surface of the comb and having projecting wiping blades contacting the comb surface during a part of its rotation so as to wipe the stripped seed off the comb surface, said blades being shorter than the length of the cylindrical frame and mounted thereon parallel to the frame axis and conforming to a helical path around the frame surface, and resilient means associated with each blade and urging the same outwardly from said cylindrical frame.

2. In combination with a seed stripper including a horizontal stripping comb, a comb wiper comprising a cylindrical frame composed of parallel rods rotating on an axis parallel to and spaced from the surface of the comb, at least one wiping blade mounted on the ends of arms pintled to one of said rods, resilient means positioned between the blade and the adjacent rod for urging the blade outwardly from the surface of the frame, the space between the comb and the frame being less than the space between the blade and the frame when the blade is in its outward position so that the blade will wipe the comb as the frame rotates.

3. In combination with a seed stripper including a horizontal stripping comb, a comb wiper comprising a cylindrical frame composed of parallel rods rotating on an axis parallel to and spaced from the surface of the comb, at least one wiping blade mounted on the ends of arms pintled to one of said rods, resilient means positioned between the blade and the adjacent rod for urging the blade outwardly from the surface of the frame, the space between the comb and the frame being less than the space between the blade and the frame when the blade is in its outward position so that the blade will wipe the comb as the frame rotates, and means limiting the action of the resilient means urging the blade outwardly from the frame surface.

4. In combination with a seed stripper including a horizontal stripping comb, a comb wiper comprising a cylindrical frame composed of parallel rods rotating on an axis parallel to and spaced from the surface of the comb, at least one wiping blade mounted on the ends of arms pintled to one of said rods, resilient means positioned between the blade and the adjacent rod for urging the blade outwardly from the surface of the frame, the space between the comb and the frame being less than the space between the blade and the frame when the blade is in its outward position so that the blade will wipe the comb as the frame rotates, and means limiting the action of the resilient means urging the blade outwardly from the frame surface, said wiping blade including a cutting edge adapted to pass over the surface of the comb.

5. In combination with a seed stripper including a horizontal stripping comb, a comb wiper comprising a cylindrical frame rotating on an axis parallel to the surface of the comb and having a plurality of projecting wiping blades contacting the comb surface during a part of its rotation so as to wipe the stripped seed off the comb surface, each of said wiping blades comprising a length of angle metal, arms pivoted to the frame surface, said blades being mounted on said arms, and springs urging said blades individually outwardly from said frame surface.

6. The combination of claim 5 including a rod for each of said springs, each of said rods being attached to a wiping blade, said frame including members having apertures to receive said rods, said rods extending through said apertures, each of said springs surrounding a said rod and being positioned between a said blade and a said apertured frame member, and abutment means on each rod on that side of said apertured frame member opposite its respective said spring.

7. The combination of claim 6 in which each said abutment means is adjustable along the length of its respective said rod.

8. The combination of claim 5 including a cutting knife affixed to each of said wiping blades.

JACOB DOUGLAS GAY, Jr.

References Cited in the file of this patent

UNITED STATES PATENTS

| Number | Name | Date |
| --- | --- | --- |
| 491,264 | Rekart | Feb. 7, 1893 |
| 501,424 | Hyde | July 11, 1893 |
| 656,830 | Whitney et al. | Aug. 28, 1900 |
| 1,113,602 | Christensen | Oct. 13, 1914 |
| 1,133,720 | Glaze | Mar. 30, 1915 |